(12) United States Patent
Kövesdi et al.

(10) Patent No.: US 10,443,565 B2
(45) Date of Patent: Oct. 15, 2019

(54) SYSTEM FOR STARTING AND LANDING A FLIGHT-CAPABLE WING CONSTRUCTION

(71) Applicant: ENERKITE GMBH, Kleinmachnow (DE)

(72) Inventors: Peter Kövesdi, Berlin (DE); Christian Gebhardt, Berlin (DE)

(73) Assignee: ENERKITE GMBH, Kleinmachnow (DE)

( * ) Notice: Subject to any disclaimer, the term of this patent is extended or adjusted under 35 U.S.C. 154(b) by 405 days.

(21) Appl. No.: 15/320,087

(22) PCT Filed: Jun. 29, 2015

(86) PCT No.: PCT/IB2015/001242
§ 371 (c)(1),
(2) Date: Dec. 19, 2016

(87) PCT Pub. No.: WO2015/198141
PCT Pub. Date: Dec. 30, 2015

(65) Prior Publication Data
US 2017/0138346 A1      May 18, 2017

(30) Foreign Application Priority Data
Jun. 27, 2014      (DE) .................. 10 2014 109 099

(51) Int. Cl.
*B64F 3/00*      (2006.01)
*B64C 39/02*      (2006.01)
(Continued)

(52) U.S. Cl.
CPC ............... *F03D 5/00* (2013.01); *B64C 31/06* (2013.01); *B64C 39/022* (2013.01); *B64F 3/00* (2013.01);
(Continued)

(58) Field of Classification Search
CPC . F03D 5/00; B64F 3/00; B64C 39/022; F05B 2240/921
See application file for complete search history.

(56) References Cited

U.S. PATENT DOCUMENTS 3,948,467 A * 4/1976 Krusius ..................... B64F 3/00
                                                     244/116
8,405,244 B2 * 3/2013 Zhang ..................... F03B 17/06
                                                      290/55
(Continued)

FOREIGN PATENT DOCUMENTS

| EP | 1 905 687 A2 | 4/2008 |
| NL | 2008549 | 9/2013 |
| WO | 2010/020263 A2 | 2/2010 |

OTHER PUBLICATIONS

International Search Report Corresponding to PCT/IB2015/001242 dated Nov. 4, 2015.
(Continued)

*Primary Examiner* — Brian M O'Hara
(74) *Attorney, Agent, or Firm* — Davis & Bujold PLLC; Michael J. Bujold

(57) ABSTRACT

A wind-driveable wing construction (30) which comprises a tether line (40), which is designed to connect the wing construction to a ground station (10) during operation, and one end of the tether line (40) being attached to the wing construction; and a bridle line system comprising a multiplicity of bridle lines (70, 71). At least two bridle lines having an end connected to the wing construction and at least one bridle line has an end connected to the tether line (40). The bridle line system is detachably connected to the tether line, during operation. The tether line (40) has a first sleeve (130) which is attached to the tether line, the bridle line system has a second sleeve (120), to which the at least one bridle line (70, 71) is connected. A capture cable is (Continued)

passed through the second sleeve, and the sleeves are designed to form a detachable connection.

16 Claims, 9 Drawing Sheets

(51) Int. Cl.
*F03D 5/00* (2006.01)
*B64C 31/06* (2006.01)

(52) U.S. Cl.
CPC ......... *F05B 2240/921* (2013.01); *Y02E 10/70* (2013.01)

(56) References Cited

U.S. PATENT DOCUMENTS

| | | | | |
|---|---|---|---|---|
| 9,321,518 | B1* | 4/2016 | Rabbino | B64B 1/50 |
| 9,587,630 | B2* | 3/2017 | Goldstein | B64B 1/50 |
| 9,771,925 | B2* | 9/2017 | GilroySmith | F03D 13/20 |
| 2012/0104764 | A1* | 5/2012 | Goo | F03D 5/06 |
| | | | | 290/55 |
| 2015/0048621 | A1* | 2/2015 | Smeenk | F03D 5/06 |
| | | | | 290/55 |
| 2015/0330368 | A1* | 11/2015 | Goldstein | F03D 1/02 |
| | | | | 290/44 |
| 2016/0355259 | A1* | 12/2016 | Vander Lind | B64D 1/08 |

OTHER PUBLICATIONS

Written Opinion Corresponding to PCT/IB2015/001242 dated Nov. 4, 2015.

* cited by examiner

SYSTEM FOR STARTING AND LANDING A FLIGHT-CAPABLE WING CONSTRUCTION

AREA OF THE INVENTION

The present invention relates to the area of renewable energy. In particular, the present invention relates to the generation of energy from wind power by means of a flight-capable wing construction which is driven by wind power.

BACKGROUND

In the area of renewable energy, installations are known which convert wind energy into electrical energy by means of a flight-capable wing construction which is coupled to a generator. During operation of such installations, however, there are hitherto unsolved challenges during the launch and landing of the wing construction.

SUMMARY

The present invention discloses a flight-capable, wind-driveable wing construction and a system for tracking a cable ratchet actuation device for the flight-capable, wind-driveable wing construction which facilitates safe launch and landing of the flight-capable, wind-driveable wing construction. The present invention furthermore discloses a wind power installation which comprises these devices.

The wing construction according to the invention comprises a tether line, which is designed to connect the wing construction to a ground station during operation, where one end of the tether line is attached to the wing construction. For the purposes of the present invention, the term "tether line" is intended to encompass generally any type of cable which is designed to connect the wing construction to the ground station during operation. "During operation" here means, in particular, that the wing construction moves in the air or is kept in the air by the tether line, where the air flows against the wing construction and the tether line at least partly determines or limits the movement of the wing construction in the air.

Cables which are designed to connect the wing construction to the ground station during operation are, in particular, those which have a predetermined elasticity and break strength. For the purposes of the present invention, the term "tether line" is additionally intended to encompass not only a continuous, i.e. one-piece cable, which connects the wing construction to the ground station, but also a tether line consisting of a plurality of cable sections which are connected to one another, for example via connecting elements. Such connecting elements may include structures to which the cable sections are attached. The structures may be frictionally engaged and materially integral, such as castings, or frictionally and positively engaged, such as splice, compression, wedge or screw connections.

The wing construction according to the invention furthermore comprises a bridle line system. The bridle line system comprises a multiplicity of bridle lines, where at least two bridle lines have an end which is connected to the wing construction and at least one bridle line has an end which is connected to the tether line. For the purposes of the present invention, any cables or cable sections, connected by means of connecting elements, which have a predetermined elasticity and break strength come into consideration as "bridle line", as already stated in relation to the tether line. The bridle lines reduce the demands on the stability of the wing construction by distributing the tethering force of the tether line over the wing construction.

The wing construction according to the invention is characterised in that the bridle line system is detachably coupled to the tether line during operation. For the purposes of the present invention, "detachably" means, in particular, that the at least one end of the bridle line system that is connected to the tether line is connected to the tether line in such a way that this connection can be broken in a planned manner by a predetermined mechanism. If the at least one end of the bridle line system that is connected to the tether line is detached, i.e. decoupled, from the tether line, force is no longer introduced into the tether line by the bridle line system, and the at least one decoupled end of the bridle line system can be moved relative to the section of the tether line to which it was connected.

This is advantageous, in particular, since it enables the wing construction to be pulled into a capture device on landing by reeling in the tether line without having to take the bridle line system into consideration. If the bridle line system were not decoupled from the tether line, the problem would arise that it would only be possible to wind the tether line onto a drum as far as the connecting point between tether line and bridle lines, since otherwise the tension on the bridle lines would become too great. On the other hand, a capture device which already captures the wing construction when the connecting point between tether line and bridle line system approaches the drum would have to be correspondingly long in order to bridge the distance between connecting point and wing construction or correspondingly large in order to provide space for the bridle line system, which is associated with considerable additional design complexity. These disadvantages are overcome by the present invention in that the connection between tether line and bridle line system is designed to be detachable, so that the section of the tether line located between connecting point and wing construction, referred to below as "capture cable", can be wound onto the drum.

The tether line preferably has a first sleeve which is attached to the tether line. In addition, the bridle line system preferably has a second sleeve, to which the at least one bridle line is connected. In operation, the capture cable is passed through the second sleeve, and the first and second sleeves are designed to form a detachable positive or non-positive connection. When the first and second sleeves have formed a positive or non-positive connection, the bridle line system is firmly connected to the tether line, so that traction forces can be introduced into the tether line via the bridle line system. If the first and second sleeves have been decoupled from one another, the capture cable is able to run through the second sleeve, so that the bridle line system does not have to be wound onto the drum during winding up of the tether line. The decoupling of the sleeves from one another is reversible, i.e. the decoupled sleeves are designed to form a positive or non-positive connection with one another again by means of a predetermined mechanism.

The second sleeve preferably has at least one clamping body. The clamping body engages, when it is in a first position, into a recess in the first sleeve. The second sleeve preferably additionally comprises a releasable locking system, which is designed to fix the at least one clamping body in the first position in a first state and, in a second state, to facilitate the movement of the at least one clamping body into a second position, in which the at least one clamping body does not engage into the recess of the first sleeve.

The at least one bridle line is preferably connected to an element which is linked to the second sleeve. The linked element enables the bridle lines, during capture of the wing construction, to be tilted away from the region through which the capture cable runs, so that further rolling-up of the capture cable is not adversely affected.

The wind power installation according to the invention comprises the flight-capable, winds driveable wing construction described above and a ground station, to which the wing construction is connected by the tether line. The wind power installation furthermore has a cable ratchet actuation device, through which the tether line is passed during operation and which is designed to release the locking of the second sleeve when the second sleeve adopts a predetermined position relative to the cable ratchet actuation device.

If the tether line is passed through the cable ratchet actuation device, the second sleeve is pulled into the cable ratchet actuation device, where the cable ratchet actuation device is designed so that the locking of the second sleeve is released when the second sleeve is pulled into the cable ratchet actuation device. The release of the locking causes the second sleeve to remain in the cable ratchet actuation device, while the first sleeve is pulled out of the second sleeve, enabling the capture cable to be pulled in.

A locking element of the second sleeve, which fixes the at least one clamping body in the first position in the first state, is preferably moved from a first position into a second position when the second sleeve is pulled into the cable ratchet actuation device, preferably against the force of an elastic element, enabling the movement of the at least one clamping body into the second position. If the clamping body is in the second position, the first and second sleeves are decoupled from one another, enabling the first sleeve to be pulled out of the second sleeve, while the second sleeve remains in the cable ratchet actuation device.

The cable ratchet actuation device is preferably integrated into a capture device, which has at least one capture ratchet which is mounted in such a way that it is able to rotate. The wing construction preferably has a capture element having at least one recess, and the at least one capture ratchet and the at least one recess are shaped in such a way that the wing construction is detachably attached to the capture device when a projection of the at least one capture ratchet engages into the at least one recess. The capture cable is preferably attached to the capture element, so that the capture element is pushed onto the capture device as far as the at least one capture ratchet when the capture cable is pulled in.

The recess in the capture element, into which the projection of the at least one capture ratchet engages, is preferably firmed by a capture ring attached to a capture funnel. The capture funnel preferably has a conical recess, whose opening facing the capture ring is larger than the internal diameter of the capture ring. The inner edge of the capture ring together with the capture funnel, which has a large internal diameter than the capture ring on the ring side, thus forms a recess in the capture element, into which the projection is able to engage, i.e. the projection of the at least one capture ratchet is in contact with the capture ring in the engaged state.

A region of the capture ring preferably extends into the conical recess, and the projection of the at least one capture ratchet which engages into the recess is shaped in such a way that it has, if the wing construction is detachably attached to the capture device, a surface facing the capture ring which runs parallel to the region of the capture ring that extends into the conical recess. Together with a correspondingly selected mounting axis of the at least one capture ratchet, in the case of which the resultant force comprising perpendicular force and tangential force (from friction) from any desired point of the surface is directed onto the mounting axis or inwards, i.e. in the direction of the centre of the capture device, past the latter, the connection between capture device and capture element is self-maintaining.

The conical recess preferably has an internal region which, on movement of the conical recess in the tether line direction, forces the projection of the at least one capture ratchet radially inwards or in the direction of the centre of the conical recess. By pulling out the capture element, the at least one capture ratchet can thus be detached from its engagement into the at least one recess. This is advantageous, in particular, since the capture ratchet thus does not have to be pressed by an actuator which is connected to the at least one capture ratchet, but instead the actuator only additionally has to be designed to keep the at least one capture ratchet in its open position, enabling the demands on the actuator to be reduced.

In another advantageous embodiment, the cable ratchet actuation device is integrated into a capture device which, instead of a capture ratchet which engages into a recess on the wing construction, has one or more claws, which are suitable in shape and size to surround all or part of the wing in the height or length direction from the outside. These claws preferably each have at least two arms which are mounted opposite one another in an articulated manner. The claws are designed so that they automatically surround the wing construction when they encounter the latter. To this end, one or more capture straps may be provided on each claw, by means of which the forces of the incoming wing construction are directed into the arms of the claws, causing the latter to close and thus attach the wing construction to the capture device in a detachable manner. The arms of the claws may be tensioned by means of a spring which acts in the opening direction, which ensures that, when the wing construction leaves the claw, the claw opens again owing to the lack of force in the capture strap. Alternatively or additionally to actuation by means of spring and strap, the claw may also be opened and closed by one or more drives.

The plurality of claws preferably each have at least two arms linked to a base of a claw. In each case, at least two arms of a claw are preferably connected at their free end to a capture strap, which is designed to be tensioned by an incoming wing construction and to move the free ends of the arms towards one another. The one or more claws preferably each have one or more resiliently elastic elements, which are designed to provide at least one arm with a torque.

The one or more claws preferably each have at least one drive, which is designed to provide at least one arm with a torque. Preferably, at least one arm of at least one claw has at least one projection and the wing construction has at least one corresponding recess and the projection engages into the recess when the wing construction is held by the claw. The one or more claws preferably each have an elastic, flexible material on a surface region of at least one arm.

The arms of the claws preferably have elements on the inside which, in the closed state, touch the (partly) surrounded wing over a large area. For this purpose, the elements may be closely modelled on the wing shape and/or consist of soft, pliable material.

Besides the tracking system of the capture element described below, the claw or claws may preferably additionally be rotated in a driven manner about a third axis which is not parallel to the first or second axes. In this way, they can be lined up even better with an incoming wing.

In a further advantageous embodiment, the capture device comprises a supporting element having a plastic supporting area (called capture cushion below), which consists of a flexible envelope and a pourable or flowable filling. The filling may consist of fluid (for example air, water, oil) or a granular material (for example powder, sand, granules, EPS beads) or mixtures of such substances.

This enables the capture cushion to be plastically deformed by the incoming wing construction, so that wing and capture element form a detachable, essentially positive connection. By pulling on the tether line, the wing construction can be pulled into the capture cushion and thus stopped at the capture cushion.

In an advantageous embodiment, the tether cable is passed through an opening in the capture cushion.

In an advantageous embodiment, the capture cushion is provided with one or more openings to the surroundings, through which ambient air, but not, for example, other filling material/fluid can pass. This opening or these openings should be selected in number and size so that deformation of the capture cushion is only facilitated with the desired damping. This enables the braking behaviour of the wing to be adjusted from the time of contact with the capture cushion and thus the acceleration forces on the wing construction to be controlled. In a further advantageous embodiment, elastic elements are provided in the capture cushion, which increase the cushion volume in the absence of the wing construction and suck in the ambient air again for the next landing operation.

In further advantageous embodiments, the capture cushion is, for the purposes of control of the acceleration forces on the wing construction, divided into a plurality of chambers, which are connected by means of connecting holes or channels which are designed in such a way that the cushion filling is able to flow between the chambers in a throttled manner. The openings/channels between the chambers should be selected in size and optionally length in such a way that deformation of the capture cushion is only facilitated with the desired damping. In a further advantageous embodiment, at least one of the chambers is formed by a container which is not located in the capture cushion, but is connected thereto via a channel or line, and in which a damping element (for example friction body, fluid damper) ensures the desired damping behaviour of the capture cushion and/or a spring element (for example metal spring, gas volume) ensures a counterpressure which is dependent on the instantaneous capture cushion volume. Besides damping properties, the spring element also enables the cushion to be provided with elastic properties. The connection between docked wing and capture cushion is thus provided with an elasticity, which is able, for example, to reduce the forces on the wing structure.

In a further advantageous embodiment, the envelope is provided with elastic properties for the same purpose through the use of elastic material and/or the filling, for example through the use or admixture of elastic filling material.

In a further advantageous embodiment, the capture cushion is placed under overpressure in order thus to increase the deformation stiffness and thus to reduce the depth to which the incoming wing construction sinks in for the same impact force.

In a further advantageous embodiment, the capture cushion is placed under reduced pressure in order thus to increase its plasticity and thus to improve the positive connection between the wing construction and the capture cushion.

The wind power installation preferably has a mast. The mast has a first end, which is connected to the ground station, and a second end, to which the cable ratchet actuation device is connected. The mast is preferably telescopic, so that it can be operated in the extended state during launch and landing of the wing construction and in the retracted state between launch and landing.

The mast preferably has a tracking system on which the cable ratchet actuation device is arranged. The tracking system preferably connects the cable ratchet actuation device to the mast in such a way that it can be pivoted in a driven manner about two axes. For the purposes of the present invention, the feature "pivotable in a driven manner" is intended to encompass, in particular, a pivotable mounting in which the mounted component can be moved between various positions by means of a drive. For example, a first element of the tracking system can be mounted in such a way that it is able to rotate about the longitudinal axis of the mast, where the tracking system has a first drive which is designed to rotate the first element relative to the mast, about the longitudinal axis of the mast. Furthermore, one end of a second element of the tracking system can be mounted on the first element in such a way that it is able to rotate, for example about an axis which is at right angles to the longitudinal axis of the mast. The tracking system may have a second drive which is designed to align the second element relative to the first element. The second element may have the cable ratchet actuation device at its other end, so that the cable ratchet actuation device tracks the movement of the tether line in the case of corresponding triggering of the drives, and can be aligned to the cable.

The tracking system preferably comprises one or more sensors, where each sensor is designed to determine the distance of the tether line from the sensor and/or the lateral position of the tether line in front of the sensor. The sensors may furthermore be designed to determine the position of the intersection of the tether line with a reference plane. The reference plane can be, for example, parallel to a plane passing through the cable ratchet actuation device, to which the longitudinal axis of the cable ratchet actuation device is perpendicular. The sensors can be, for example, acoustic or optical sensors, in particular ultrasound sensors.

The tracking system preferably comprises a control device, which is designed to control the drives of the tracking system on the basis of information from the sensors in such a way that the cable ratchet actuation device tracks a movement of the tether line.

The mast is preferably connected to the ground station in such a way that it can be pivoted about at least one axis, preferably about two axes. For example, one end of the mast can be mounted on the ground station in such a way that it is able to rotate, preferably about the horizontal axis and the vertical axis. Two drives can be provided to align the second end of the mast.

The system according to the invention for tracking the cable ratchet actuation device for the flight-capable, wind-driveable wing construction comprises a first device, which can be pivoted about a first axis in a driven manner, and a second device, which is arranged on the first, pivotable device. The second device can be pivoted relative to the first device about a second axis in a driven manner, where the first axis and the second axis are not identical. Furthermore, the system according to the invention comprises the cable ratchet actuation device, which is arranged on the second device and through which the tether line is passed. Furthermore, the system according to the invention comprises a sensor device, which is arranged on the second device and which is designed to determine information on a position of the tether line, in particular on the point of intersection of the tether line with the reference plane. The system according to the invention furthermore comprises a control device, which is designed to control the drives of the first and second devices on the basis of the information from the sensor device in such a way that the cable ratchet actuation device is moved to track a movement of the tether line.

The first or second device preferably has a deflection roller, over which the tether line is passed. The sensor device preferably comprises one or more optical and/or acoustic sensors, such as, for example, a laser measuring instrument, a camera or ultrasound sensors.

As described above, the system for tracking a cable ratchet actuation device for a flight-capable, wind-driveable wing construction may be part of a wind power installation which comprises a flight-capable, wind-driveable wing construction having a tether line, where the tether line is designed to connect the wing construction to a ground station during operation, and where one end of the tether line is attached to the wing construction.

As described above, the wind power installation preferably has a ground station and a mast, where a first end of the mast is connected to the ground station and the system for tracking the cable ratchet actuation device is connected to a second end of the mast. The mast is preferably connected to the ground station in such a way that it is can be pivoted about at least one axis in a driven manner. The mast is furthermore preferably a telescopic mast.

As described above, the cable ratchet actuation device is preferably integrated into the capture device, through which the tether line is passed and which preferably has at least one capture ratchet which is mounted in such a way that it is able to rotate. In addition, the wing construction preferably has a capture device having at least one recess, and the at least one capture ratchet and the at least one recess are shaped in such a way that, when a projection of the at least one capture ratchet engages into the at least one recess, the wing construction is attached to the capture device in a detachable manner.

DETAILED DESCRIPTION OF PREFERRED ILLUSTRATIVE EMBODIMENTS

Figure 1:
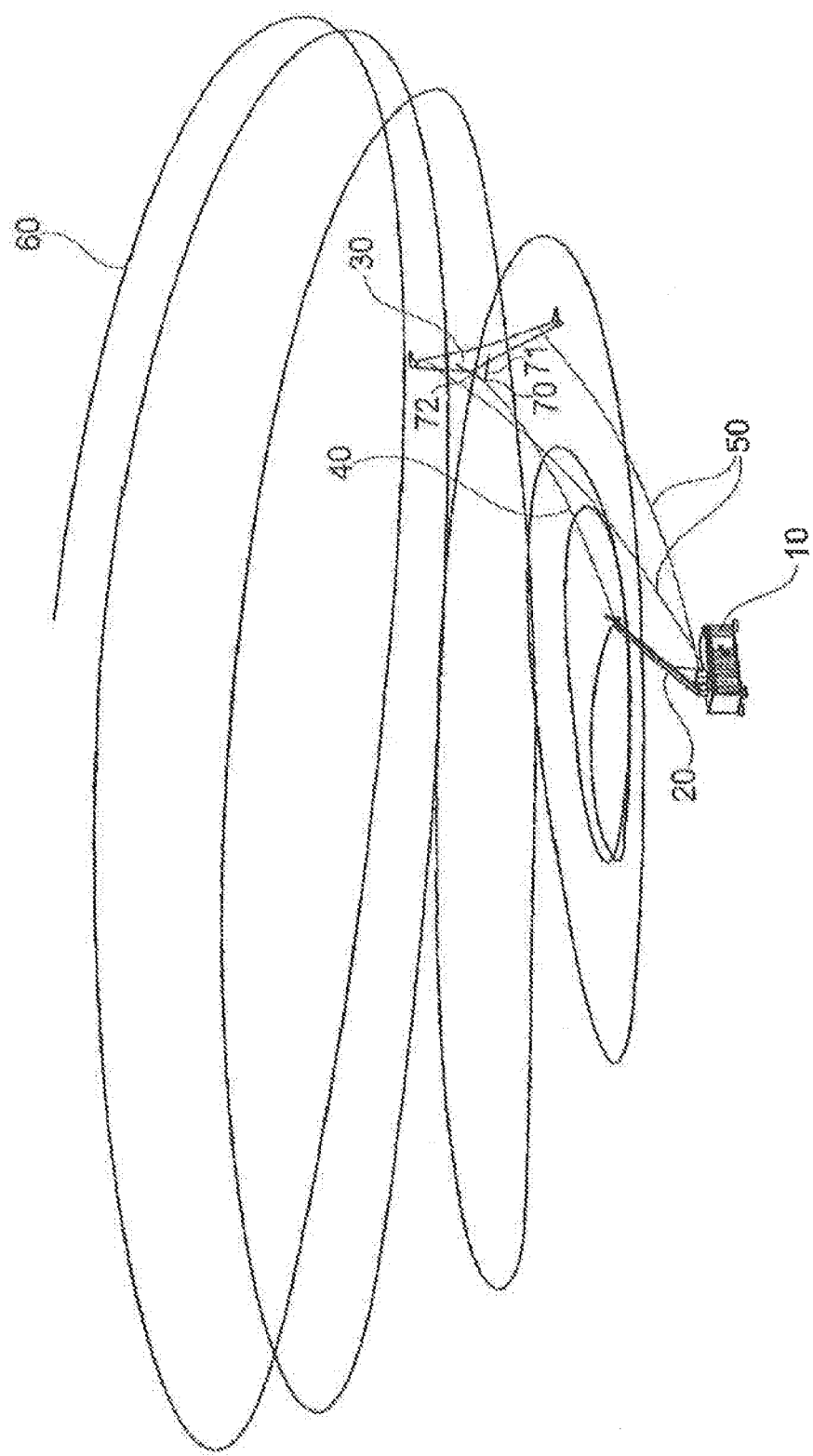
FIG. 1 shows a schematic, illustrative representation of a preferred embodiment of the wind power installation.

FIG. 1 shows a schematic, illustrative representation of a preferred embodiment of the wind power installation. The wind power installation shown in FIG. 1 comprises a ground station 10, a mast 20, which is linked to the ground station and is mounted in such a way that it is able to rotate, a flight-capable, wind-driveable wing construction 30, a tether line 40, which connects the wing construction 30 to the ground station 10 via the mast 20, and two control cables 50, which are run directly from the ground station 10 to the wing construction 30 and are attached thereto.

At the beginning of the launch operation (beginning of the flight path 60), the wing construction 30 is docked on the mast 20, and the mast 20 is pivoted about the vertical axis. As soon as the wing construction 30 has sufficient lift to be able to fly in a stable manner, it is undocked from the mast 20. After the undocking, the rotation of the mast 20 is continued, and the tether line 40 is let out further until the bridle lines 71, 72 are taut.

The taut bridle lines 71, 72 are coupled to the tether line 40 by means of a cable ratchet actuation device described below (not shown in FIG. 1) having a cable ratchet 70. When the wing construction 30 has sufficient height and cable length, it is brought into figure-of-eight flight, i.e. the flight path of the wing construction 30 describes a horizontal eight. When the wing construction 30 is in figure-of-eight flight, the rotation of the mast 20 is stopped and the mast 20 is brought into a fixed angle position.

The landing operation takes place analogously in the opposite manner. The wing construction 30 is pulled in by means of the tether line 40 and finally brought out of the figure-of-eight flight into a flight path around the ground station 10, with the mast 20 rotating along with the wing construction 30. The tether line 40 is pulled in further during the rotation of the mast 20. When the cable ratchet 70 reaches the cable ratchet actuation device, the bridle lines 71, 72 are decoupled from the tether line 40, so that the tether line 40 can be pulled in further without interference by the bridle lines 71, 72.

Figure 2:
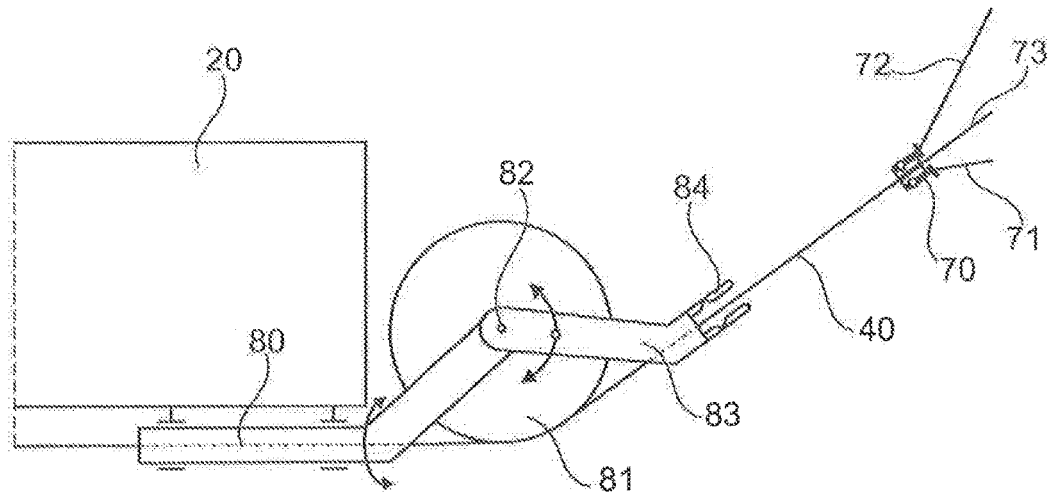
FIG. 2 shows a schematic cross-sectional view of elements of a preferred embodiment of the system for tracking the cable ratchet actuation device.

The structure and functioning of the tracking system are explained in greater detail with reference to FIG. 2, which shows a schematic cross-sectional view of elements of a preferred embodiment of the system for tracking the cable ratchet actuation device. In order to avoid contact of the running and tensioned tether line 40 with stationary components for reasons of wear and to ensure a friction-free coupling and decoupling operation of the cable ratchet 70, a tracking system mounted on the mast 20 can move the cable ratchet actuation device in a contact-free manner to follow the movements of the tether line 40 or capture cable 73 (section of the tether line between the cable ratchet 70 and the wing construction 30) and align the cable ratchet actuation device relative to the tether line 40.

The tracking system comprises a lever 80 which can be pivoted in a driven manner, having a first section which is arranged parallel to the longitudinal axis of the mast 20. As shown in FIG. 2, the first section of the lever 80 is mounted on the mast 20 in such a way that it is able to rotate about its longitudinal axis. The tether line 40 is passed through the first section of the lever 80. The lever 80 furthermore comprises a second section, which is tilted relative to the first section and can be pivoted about the longitudinal axis of the first section. The second section of the lever 80 has an end on which a deflection roller 81 is mounted. The deflection roller axis of rotation 82 runs through an end region of the second section of the first lever 80 and is aligned at right angles to the longitudinal axis of the second section.

A further lever 83 which can be pivoted in a driven manner is linked to the second section of the lever 80. The lever 83 comprises a first section, which is linked to the lever 80, and a second section, which is tilted relative to the longitudinal axis of the first section. The tether line 40 is passed through the second section. At the end of the second section, where the tether line 40 exits from the lever 83, a cable ratchet actuation device 84 is arranged. As shown in FIG. 2, the tether line 40 exiting from the lever 83 is passed through the cable ratchet actuation device 84.

The control of the tracking and alignment of the cable ratchet actuation device 84 is explained in greater detail in connection with FIG. 3, which shows a schematic perspective view of elements of a preferred embodiment of the system for tracking the cable ratchet actuation device. The tracking system shown in FIG. 3 comprises five sensors 90, for example ultrasound sensors, which are arranged around the capture cable 73. The sensors 90 are integrated into the pivotable lever 83 shown in FIG. 2, which is not shown in FIG. 3 in order to simplify the depiction of the arrangement of the sensors 90. The sensors 90 are arranged at equal distances in the circumferential direction around the capture cable 73 and generate signals which are indicative of the separation between the capture cable 73 and the respective sensor. From these signals, a deviation signal between an actual position or actual alignment and a desired position or desired alignment of the tracking system can be calculated and used to pivot the levers 80, 83 of the tracking system in such a way that the tracking system will adopt its desired position and desired alignment. In the desired position and desired alignment, the tether line 40 passes centrally through the cable ratchet actuation device 140.

Figure 3:
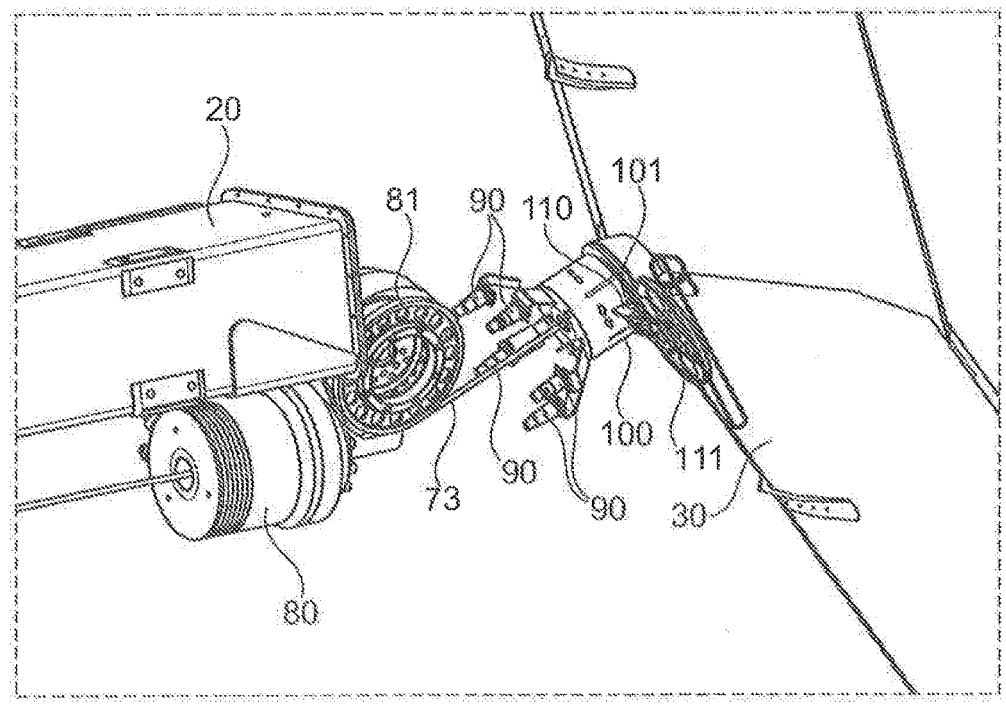
FIG. 3 shows a schematic perspective view of elements of the preferred embodiment of the system for tracking the cable ratchet actuation device.

FIG. 3 furthermore shows a capture device having a capture cone 100, with which the wing construction 30 is docked. The capture cone 100 has a slot 101 on one side. An intermediate carrier 110 which carries a deflection roller 111 projects out of the slot 101. During operation, the bridle lines 71, 72 (not shown) are connected to one another and passed over the deflection roller 111.

Figure 4:
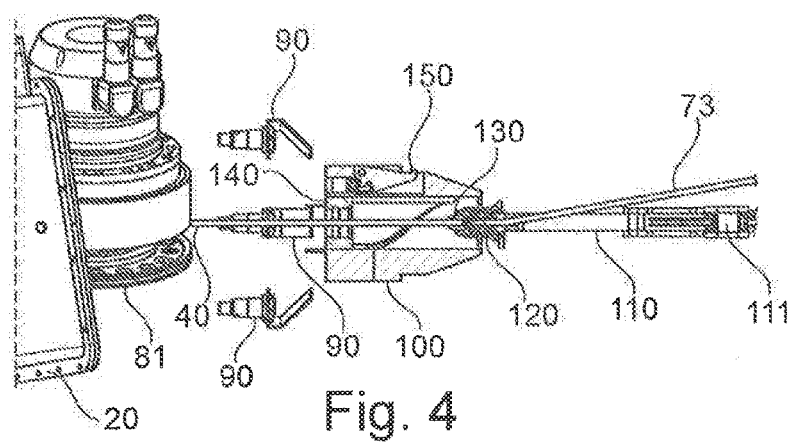
FIGS. 4 to 6 show schematic partial sectional views of the decoupling process of the cable ratchet and the coupling process of the wing construction.
Figure 5:
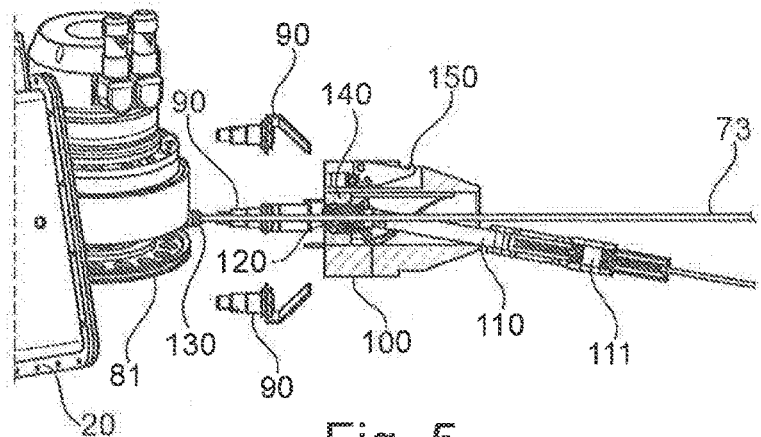

The principle of the docking operation and the use of the intermediate carrier 110 and the deflection roller 111 are explained in greater detail in connection with FIGS. 4 to 6, which show schematic partial sectional views of the decoupling process of the cable ratchet. As shown in FIG. 4, the deflection roller 111 is connected to a carrier sleeve 120 via the intermediate carrier 110. The carrier sleeve 120 is positively connected to a cable sleeve 130, which is arranged in the carrier sleeve 120 and is attached to the tether line 40. The carrier sleeve 120 comprises a mechanism for decoupling and coupling the cable sleeve 130, which is actuated by a cable ratchet actuation device 84 (also called cable ratchet dock 140 below). If the carrier sleeve 120, as shown in FIG. 5, is pulled into the cable ratchet dock 140, the cable ratchet dock 140 decouples the cable sleeve 130 from the carrier sleeve 120, so that the intermediate carrier 110 is decoupled from the tether line 40. As a consequence of the decoupling, the bridle lines lose tension and the intermediate carrier 110 tilts away downwards.

Figure 6:
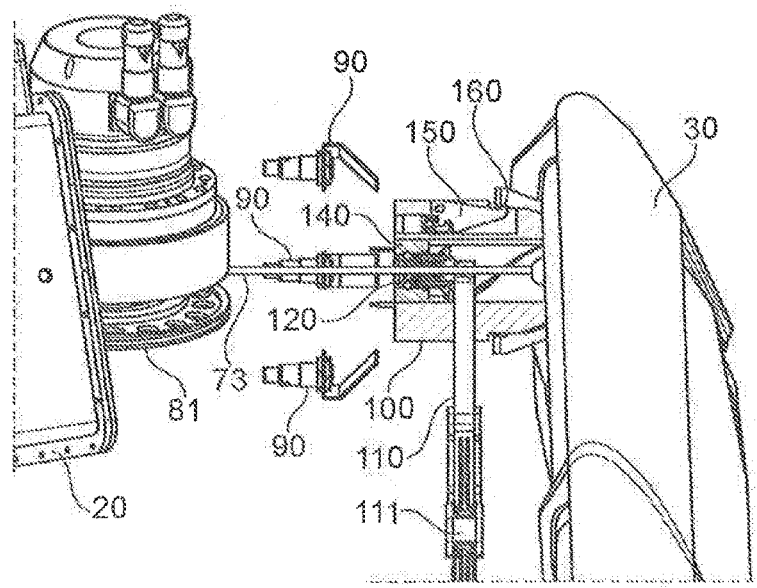

By further pulling-in of the capture cable, a capture element of the wing construction 30 is pulled onto the capture cone 100 until a capture ratchet 150, which is mounted on the capture cone 100 in such a way that it is able to rotate, engages, as shown in FIG. 6, into a recess 160 in the capture element, and the wing construction 30 is fixed to the capture device. Although only one capture ratchet 150 is shown in FIGS. 4 to 6, it is clear that a plurality of capture ratchets can be used, as shown in FIG. 3.

The mechanism for decoupling and coupling the cable sleeve 130 is described in greater detail in connection with FIG. 7, which shows a schematic perspective sectional view of a preferred embodiment of the cable ratchet in a preferred embodiment of the cable ratchet dock 140. The cable ratchet shown in FIG. 7 consists of the carrier sleeve 120 with a connecting point 170, to which the bridle lines are connected directly or by means of one or more further force-transmitting components, such as, for example, the intermediate carrier 110, and main clamping bodies 171, for example balls, which are distributed on the periphery of the carrier sleeve 120 and are mounted in the carrier sleeve 120 in such a way that they can be moved in the radial direction. An outer sleeve 172, which limits or releases the radial movement latitude of the main clamping bodies 171 outwards, depending on the axial position, is installed on the carrier sleeve 120 in an axially movable manner.

Furthermore, an inner sleeve 173, which limits or releases the radial movement latitude of the main clamping bodies 171 inwards, depending on the axial position, is installed in the carrier sleeve 120.

The simple radial separation of the limiting inside surface of the outer sleeve 172 and the limiting outside surface of the inner sleeve 173 is smaller than the radial dimension of the main clamping bodies 171, i.e. smaller than, for example, the ball diameter, so that the outer sleeve 172 and the inner sleeve 173 cannot simultaneously slide in front of the movement region of the main clamping bodies 171.

A cable sleeve 130 is firmly installed in the axial cable direction on the continuous tether line 40. This is provided on the outside with one or more recesses 174 in such a way that the main clamping bodies 171, when they are in a radial position inside the outer sleeve 122 (position A, shown in FIG. 7), are able to engage in the cable sleeve 130 and thus prevent this from leaving the carrier sleeve 120 in the axial direction, and clear the axial path of the cable sleeve 130 for the carrier sleeve 120 when they are in a radial position outside the inner sleeve 173 (position B, not shown in FIG. 7).

In position A, the main clamping bodies 171 hold the cable sleeve 130 with the main cable 40 in the carrier sleeve 120 with the bridle cables. The bridle lines are thus coupled to the tether line 40. The said recess 174 is advantageously a circumferential groove. This results in the rotational position of the cable sleeve 130 playing no role in the position of the main clamping bodies 171 on the periphery of the carrier sleeve 120.

The cable ratchet dock 140, which has a through-opening which is sufficiently large to allow the tether line 40, the cable sleeve 130 and optionally part of the carrier sleeve 120 through, but while it forms a positive or non-positive connection to the outer sleeve 152, ensuring that the outer sleeve 172 is pushed on when the cable ratchet is pulled through, is located at the point where the decoupling is to take place. The radial path of the main clamping bodies 171 in the carrier sleeve 120 thus becomes clear to the outside.

Figure 7:
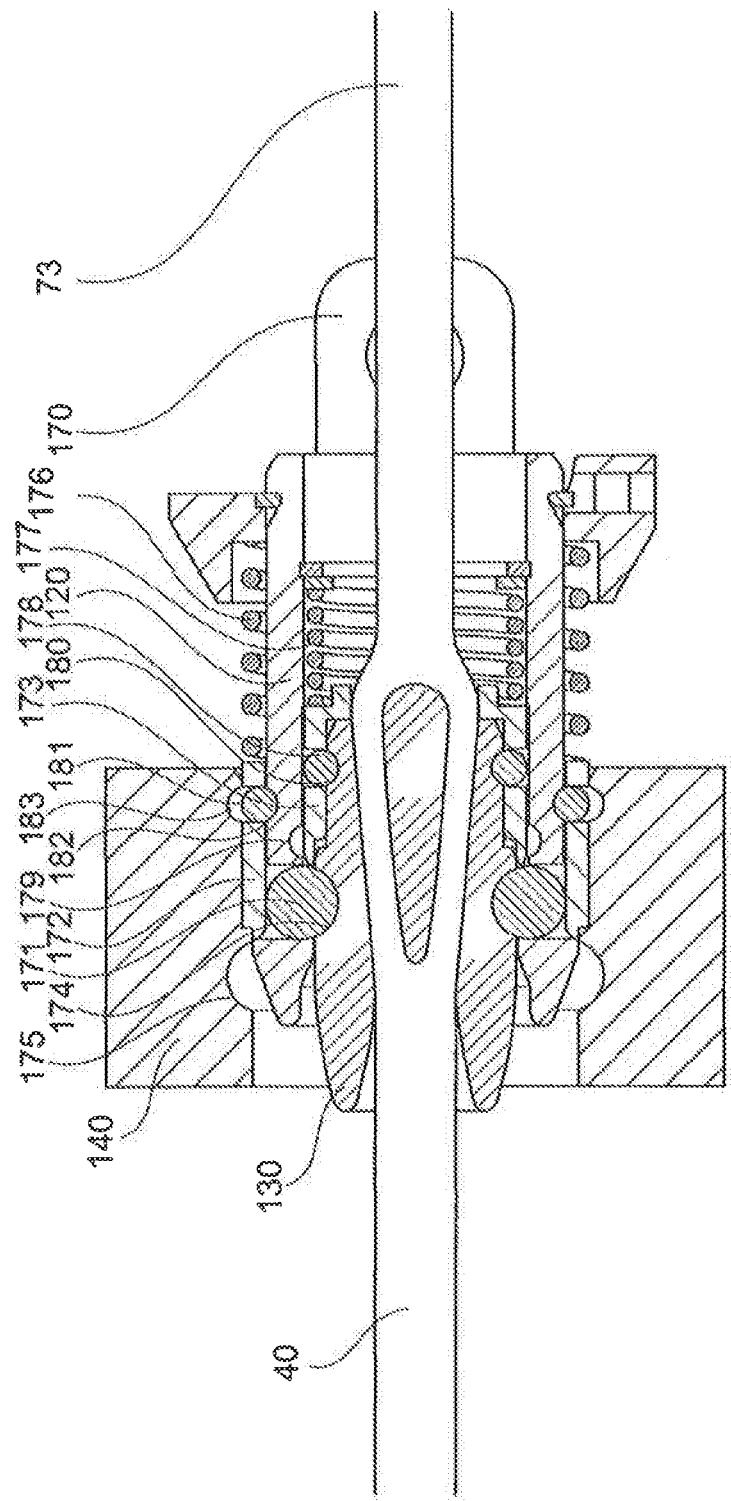
FIG. 7 shows a schematic perspective sectional view of a preferred embodiment of the cable ratchet in a preferred embodiment of the cable ratchet actuation device.

The cable ratchet dock 140 is provided with a recess 175 in such a way that the main clamping bodies 171, when they are in a radial position outside the inner sleeve 173 (position B, not shown in FIG. 7), are able to engage into the cable ratchet dock 140 and thus prevent the carrier sleeve 120 from leaving the cable ratchet dock 140 in the axial direction, and clear the axial path of the carrier sleeve 120 for the cable ratchet dock 140 if they are in a radial position inside the outer sleeve 172 (position A, shown in FIG. 7). The said recess 175 is advantageously a circumferential groove. This results in the rotational position of the cable ratchet dock 140 playing no role in the position of the main clamping bodies 171 on the periphery of the carrier sleeve 120. In position B, the main clamping bodies 171 hold the carrier sleeve 120 with the bridle cables in the cable ratchet dock 140. The bridle lines are thus coupled to the cable ratchet dock 140. The cable sleeve 130, by contrast, is axially released against the cable ratchet dock 140 and the carrier sleeve 120.

In an advantageous embodiment, in order to hold both the inner sleeve 123 and the outer sleeve 172 reliably in front of the movement region of the main clamping bodies 171, one or more springs 176 and 177, which in each case push/pull or hold the inner sleeve 173 and the outer sleeve 172 in front of the movement region of the main clamping bodies 171, are provided in each case.

If the bridle lines are under load when the cable ratchet latches into the cable ratchet dock 140, there is a risk of the cable sleeve 130 leaving the carrier sleeve 120 without the inner sleeve 173 having reached the axial position which blocks the movement range of the main clamping bodies 171 to the inside. The main clamping bodies 171 would thus not be forced into position B, and the carrier sleeve 120 would thus also not be locked in the cable ratchet dock 140. In this case, the traction force of the tether line 40 has already decoupled from the bridle lines, so that the bridle lines, supported by the spring 176 on the outer sleeve 172, are able to pull the remaining parts of the cable ratchet out of the cable ratchet dock 140 again. In order to counter this, one or more secondary clamping bodies 176, for example balls, which are distributed on the periphery of the inner sleeve 173 and are mounted in the inner sleeve 173 in such a way that they are able to move in the radial direction, are provided. The radial size of the secondary clamping bodies 178, i.e., for example, the ball diameter, is greater than the simple wall thickness of the inner sleeve 173. The movement range of the secondary clamping bodies 178 is limited to the outside by the inside of the carrier sleeve 120. The carrier sleeve 120 is provided on the inside with one or more recesses 179 in such a way that the latter only clear the movement range of the secondary clamping bodies 178 to a certain extent to the outside when the inner sleeve 173 is in the axial position in which the movement range of the main clamping bodies 171 is blocked to the inside. The said recess 179 is advantageously a circumferential groove. This results in the rotational position of the carrier sleeve 120 playing no role in the position of the secondary clamping bodies 178 on the periphery of the inner sleeve 173.

The cable sleeve 130 is furthermore provided with a recess 180 in such a way that the secondary clamping bodies 178, when they are in a radial position inside the carrier sleeve 120 away from their recess(es), are able to engage into the cable sleeve 130 and prevent this from leaving the inner sleeve 173 in the axial direction, and clear the axial path of the cable sleeve 130 against the inner sleeve 173 when they are in a radial position inside the recess 179 in the carrier sleeve 120. The said recess 180 in the cable sleeve 130 is advantageously a circumferential groove. This results in the rotational position of the cable sleeve 130 playing no role in the position of the secondary clamping bodies 178 on the periphery of the inner sleeve 173.

This arrangement prevents the cable sleeve 130 from leaving the inner sleeve 173 and thus the remainder of the cable ratchet until the inner sleeve 173 has reached the axial position against the carrier sleeve 120 in which it limits the movement range of the main clamping bodies 171 to the inside. Separation of the tether line 40 from the bridle cables thus inevitably only takes place when the bridle lines are attached to the cable ratchet dock 140.

If the bridle lines are under load when the cable ratchet is unlatched from the cable ratchet dock 140, there is a risk of the cable ratchet leaving the cable ratchet dock 140 without the outer sleeve 172 having reached the axial position which blocks the movement range of the main clamping bodies 171 to the outside. The main clamping bodies 171 would thus not be forced into position A, and the cable sleeve 130 would thus also not be locked in the carrier sleeve 120. In this case, the cable ratchet may decouple from the cable ratchet dock 140 even before the tether line 40 has coupled to the bridle lines, so that the bridle lines may detach from the tether line 40 again after leaving the cable ratchet dock 140. In order to counter this, one or more secondary clamping bodies 181, for example balls, which are distributed on the periphery of the outer sleeve 172 and are mounted in the outer sleeve 172 in such a way that they can be moved in the radial direction, are provided. The radial size of the secondary clamping bodies 181, i.e., for example, the ball diameter, is greater than the simple wall thickness of the outer sleeve 172. The movement range of the secondary clamping bodies 181 is limited to the outside by the inside of the cable ratchet dock 140. The carrier sleeve 120 is provided on the outside with one or more recesses 182 in such a way that the movement range of the secondary clamping bodies 181 is only cleared to a certain extent to the inside in the axial position of the outer sleeve 172 in which the movement range of the main clamping bodies 171 is blocked to the outside. The said recess 182 is advantageously a circumferential groove. This results in the rotational position of the carrier sleeve 120 playing no role in the position of the secondary clamping bodies on the periphery of the outer sleeve 172.

The cable ratchet dock 140 is furthermore provided with a recess 183 in such a way that the secondary clamping bodies 181, when they are in a radial position outside the carrier sleeve 120 away from the recess(es), are able to engage into the cable ratchet dock 140 and thus prevent the outer sleeve 172 from leaving the cable ratchet dock 140 in the axial direction, and clear the axial path of the outer sleeve 172 against the cable ratchet block 140 if they are in a radial position inside the recess 182 in the carrier sleeve 120. The said recess 183 in the cable ratchet dock 140 is advantageously a circumferential groove. This results in the rotational position of the cable ratchet dock 140 playing no role in the position of the secondary clamping bodies on the periphery of the outer sleeve 172.

This arrangement prevents the outer sleeve 172 and thus the remainder of the cable ratchet from leaving the cable ratchet dock 140 until the outer sleeve 172 has reached the axial position against the carrier sleeve 120 in which it limits the movement range of the main clamping bodies 171 to the outside. Separation of the bridle lines from the cable ratchet dock 140 thus inevitably only takes place when the tether line 40 is attached to the bridle lines.

Since, during undocking of the wing construction 30, the forces in the capture cable 73 simultaneously drop from the moment at which the bridle lines take on wing forces, the problem exists that the cable sleeve 130 may not be pulled further into the cable ratchet and instead the bridle lines introduce the forces into the cable ratchet dock 140. In order to counter this, it would be possible, by attaching the capture cable 73 to the connecting line between the left-hand and right-hand bridle lines, to ensure that the bridle lines and the capture cable 73 simultaneously remain under tension irrespective of the instantaneous angle of attack of the wing construction 30. However, this may be impossible, depending on the wing design and shape, if, for example, the connecting line between the left-hand and right-hand bridle lines in the centre of the wing construction 30 does not lie in a sufficiently strong structure. A further solution would be to bring the wing construction 30, at the moment of undocking of the cable ratchet, into an angle of attack which keeps the capture cable 73 under tension. However, in the case of wing constructions 30 with bridle, the wing structure is not sufficiently strong to be able to dissipate the full loads merely via the central capture cable 73. Under large loads, i.e. in generation mode, it must therefore be prevented that the loads in the capture cable 73 exceed a certain proportion of the total cable loads. This means that the capture cable 73 must be substantially load-free at every angle of attack of the wing construction 30 that is used in operation, whereas, in this problem solution, it should not be placed under load at the moment of undocking of the cable ratchet. In this solution, an angle of attack outside all operational angles of attack must therefore be adopted at this moment, which may result in instabilities or loss of control during the critical launch operation.

In order to get around this, the capture cable 73 or a part thereof may be elastic. The elastic resilience should be selected to be sufficiently small that it does not introduce any impermissibly large loads into the junction of the capture cable 73 at the wing construction 30 at any desired angles of attack of the wing construction 30 that are used in operation, i.e. capture cable stretches, i.e. does not take away an impermissibly large proportion of the load from the bridle lines and transfer it via the capture cable 73, but is sufficiently large that it is capable of reliably pulling the cable sleeve 130 into the cable ratchet and bringing the inner sleeve 173 of the cable ratchet into the position which clears the movement range of the main clamping bodies 171 to the inside against its spring force during the undocking operation at all angles of attack and corresponding capture cable stretches which occur in the process. This force will be called force S below.

In an advantageous embodiment, the elasticity of the capture cable 73 is blocked above a certain capture cable load. This load level is above the force S, but below the loads that the wing construction 30 exerts on the capture cable 73 throughout the launch or landing operation. In this way, the wing construction 30 is not operated on an elastic capture cable 73 (apart from the natural, slight elasticity inherent in cables) during the launch/landing operation, which could result in undesired vibrations and in loss of controllability. During launch, the elasticity only acts in this way when sufficient loads have transferred from the capture cable 73 to the relatively inelastic bridle lines, or, during landing, only until sufficient loads have transferred from the bridle to the capture cable 73. The blocking should only occur in the case of such an elongation in the length of the capture cable 73 in such a way that the blocking of the capture cable 73 does not occur throughout the range of angles of attack of the wing construction 30 that is utilised in operation.

In an advantageous embodiment, the elasticity is achieved by one or more rubber cables or other elastic elements which are inlaid into the capture cable 73 or attached parallel to the capture cable 73 and in the untensioned state are shorter than their connection region in the capture cable 73. The capture cable 73 can itself serve as blocking of the elasticity if the region with the inlaid/attached elastic element is tensioned by extension thereof.

Figure 8:
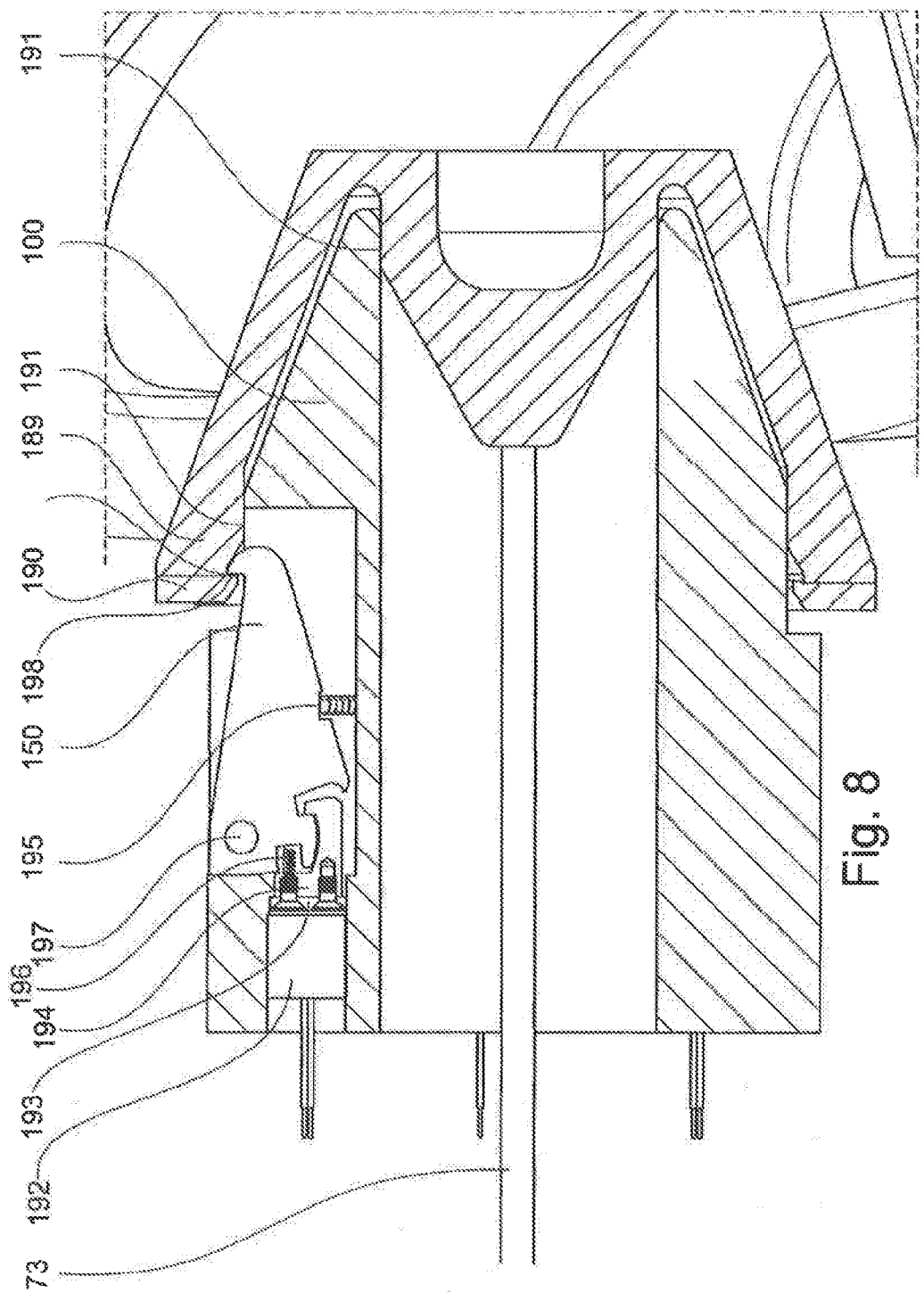
FIG. 8 shows a schematic perspective sectional view of elements of a preferred embodiment of the capture device and the capture element.

FIG. 8 shows a schematic perspective sectional view of elements of a preferred embodiment of the capture device and the capture element. The capture device is conically shaped to form a capture cone 100 in the direction of the wing construction 30. The wing construction 30 has a capture element which comprises a capture funnel 189 and a capture ring 190. The latter form a circumferential recess 160, into which a projection of the capture ratchet 150 engages. Besides the conical surfaces, the capture cone 100 on one hand and the capture funnel 189 and the capture ring 190 on the other hand also have cylindrical surfaces 191, which facilitate axial movement of the wing construction 30 on the capture cone 100 without increasing or reducing the play, or without reducing the ability of the system to accommodate moments about axes transverse to the main axis of the capture cone 100.

In addition, fixed or pressure-adjustable friction surfaces and/or elastic elements may be provided between the conical, cylindrical or face surfaces of the capture cone 100 on the one hand and the capture funnel 189 and capture ring 190 on the other hand, ensuring fixed or adjustable rotational damping/elasticity of the wing construction 30 against the capture cone 100. Alternatively or additionally, rotationally fixed coupling of the wing construction 30 to the capture device may be provided by a positive or non-positive connection in the direction of rotation about the main axis between capture cone 100 on the one hand and capture funnel 189 and capture ring 190 on the other hand. This allows rotational damping, elasticity or drive of the wing construction 30 in the coupled state by rotational damping, elasticity or drive of the capture cone 100 against the ground station.

In the docked state, a driven, damped or elastic element can likewise engage in the capture funnel 189 and the capture ring 190 or other parts connected to the wing construction 30, directly or indirectly via force-transmitting components, in order to facilitate rotational damping, elasticity or drive of the wing construction 30 in the docked state.

The capture cable 73 passes through the capture cone 100 and is attached in the capture funnel 189. One or more ratchet mechanisms, each comprising a capture ratchet 150, a retaining magnet 192, a attraction plate 193, a attraction plate lever 194, a main return spring 195 and a attraction plate return spring 196, are arranged in a circular manner around the capture cone 100.

The capture ratchet 150 is mounted at point 197 in such a way that it is able to rotate. In addition, it has a self-maintaining shape, i.e. forces applied by the wing construction 30 in the detachment direction are converted into a moment about the ratchet mounting axis in the closing direction, i.e. outwards. For this purpose, the effective surface of the capture ratchet 150 is angled in such a way that the resultant force comprising perpendicular and tangential force (from friction) from any desired point of the surface is directed onto the ratchet mounting point 197 or past it on the inside. In an advantageous embodiment, in particular if frictional forces are unknown, the ratchet surface is angled in such a way that even the simple perpendicular force from any desired point of the surface is directed onto the ratchet mounting point 197 or past it on the inside.

It Instead of pressing the capture ratchet 150 against the large closing moment by means of a locally installed actuator (for example lifting magnet) during the unlatching operation, it and the recess 160 formed by the capture funnel 189 and capture ring 190 are shaped in such a way that the capture ratchet 150 is firstly pressed on by further pulling of the wing construction 30 by means of the capture cable 73, i.e. is pressed radially inwards in the capture cone 100. In this position, it can be held by the retaining magnet 192 until the wing construction 30 has left the area of engagement of the capture ratchet 150. After the retaining magnet 192 has been switched off, the capture ratchet 150 is returned to its starting position by the main return spring 195.

In order that the retaining magnet 192 does not prematurely limit the range of movement of the capture ratchet 150 to the inside, or the retaining magnet 192 becomes fully effective (i.e. is touched by its attraction plate 193) before the capture ratchet 150 reaches the inner limit of its proposed range of movement, a attraction plate lever 194 is provided, which is connected to the attraction plate 193 and transfers the retaining force of the magnet to the capture ratchet 150, but allows further pressing of the capture ratchet 150 (radially inwards in the capture cone) against the main return spring 195 and additionally against the attraction plate return spring 196. This [lacuna] the limit of the movement that the capture ratchet 150 is able to perform by further pulling of the capture funnel 189, irrespective of the point at which the attraction plate 193 precisely reaches the retaining magnets 192. This is important, since precise positioning of the capture ratchet 150 by the wing construction 30 with its capture ring 190 is extremely difficult and would require both tight manufacturing tolerances and also tight control tolerances. The solution described above enables the wing construction 30 to be pulled as far as the stop, but the retaining magnet 192 is already touched by the attraction plate 193 before this point and is thus fully effective, and reliable keeping open of the capture ratchet 150 during the decoupling operation is thus ensured. There is neither a risk of the retaining magnet 192 not being fully reached by the attraction plate 193 and thus only being able to apply a fraction of its retaining force, nor a risk of the capture ratchet 150 being stopped in its movement by the retaining magnet 192, or of the capture ratchet 150 or retaining magnet 192 being loaded to an impermissibly large extent.

Figure 9:
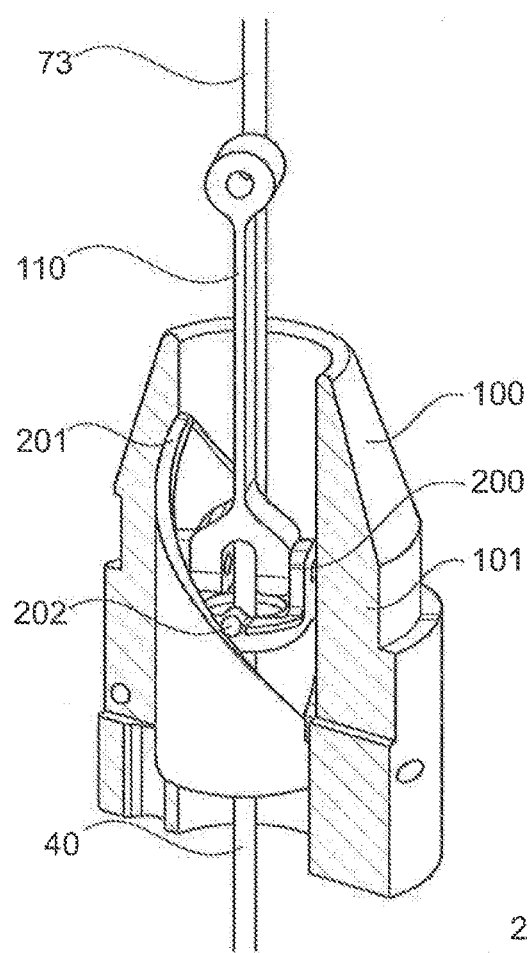
FIG. 9 shows a schematic perspective sectional view of elements of a preferred embodiment of the capture device.

FIG. 9 shows a schematic perspective sectional view of elements of a preferred embodiment of the capture device. Since the bridle lines are not connected to the wing construction 30 inside the capture funnel 189, these are, as described above, not attached directly to the carrier sleeve 120, but instead via a narrow intermediate carrier 110 and a pivotable uniaxial joint 200, whose pivot mounting point comes to rest inside the capture cone 100 before the docking operation of the wing construction 30. As soon as the bridle lines and thus the joint 200 become force-free, the intermediate carrier 110 together with the bridle lines is able to tilt to the side through the radial slot 101 in the capture cone 100.

In order that intermediate carrier 110 and slot 101 come to rest opposite one another, the rotational position of the joint 200 relative to the capture cone 100 must be defined correctly. To this end, two spirally running edges 201 are provided inside the capture cone 100, and a tappet 202, which slides along the edge and rotates the joint 200 into the correct position during insertion into the capture cone 100, is provided on the joint 200. In order to achieve reliable tilting-out of the intermediate carrier 110 from the capture cone 100, the joint 200 may be spring-loaded. This is advantageously effected by the spring forces being sufficiently small that the intermediate carrier 110 is not tilted out of the cable axis under the loads in the bridle lines that occur during operation. Tilting-out/in vibrations due to different cable load levels are thus avoided in the joint 200. Alternatively or additionally, the capture cable 73 can be passed through the joint 200 in such a way that is capable of tilting the latter by at least a distance as soon as it is under tension and the tensions in the bridle lines are sufficiently small.

Figure 10:
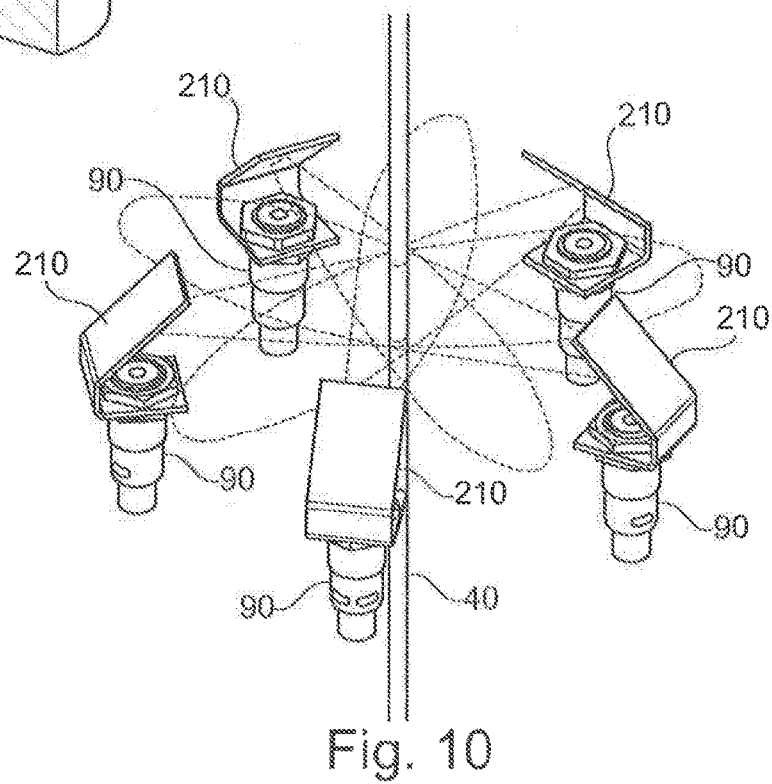
FIG. 10 shows a schematic perspective view of elements of a preferred embodiment of the system for tracking the cable ratchet actuation device.

FIG. 10 shows a schematic perspective view of elements of the system for tracking the cable ratchet actuation device. The measurement device shown in FIG. 10 comprises five ultrasound sensors 90, each of which measures its separation from the tether line 40. From these signals, the position of the tether line 40 can be determined within the range limited by the sensors 90. Together with the transducers of the two drives of the tracking system, the cable angle to the mast can be measured therefrom in a contact-free manner. Furthermore, this measurement can be used for regulating the position of the tracking system. The spatial measurement ranges of the sensors 90 are shown by dashed lines and can be adjusted by alignment of the reflector 210 provided on each sensor 90. Instead of ultrasound, other measurement methods can also be used. These may measure the separation of the tether line 40 from a sensor 90 or its left/right position in front of a sensor 90, or both, such as, for example, a row of lasers or a camera. Alternatively, mechanical, non-contact-free scanning can be employed, for example by a plurality of levers which can be moved or tilted in a linear manner and run on the tether line 40 with or without rollers.

Figure 11:
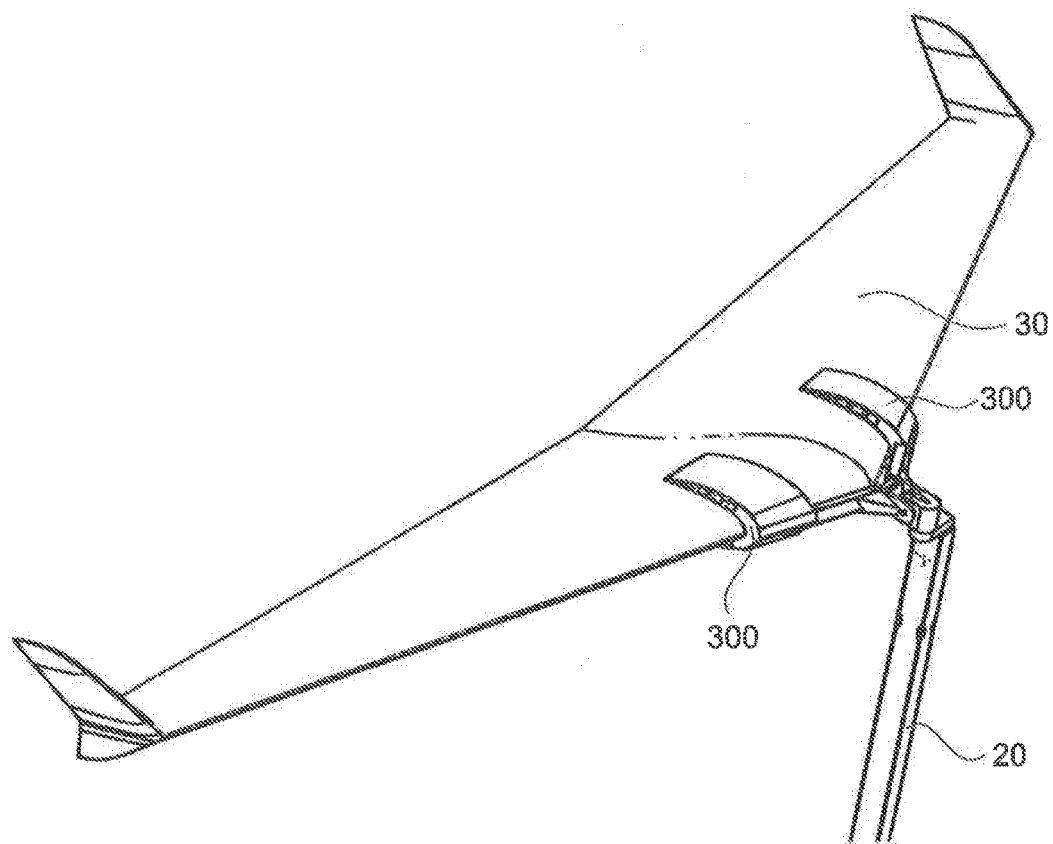
FIG. 11 shows a schematic, perspective view of a capture system.

FIG. 11 shows a schematic, perspective view of the capture system, which is connected to the mast 20 and has two claws 300 which are designed to hold the wing construction 30.

Figure 12:
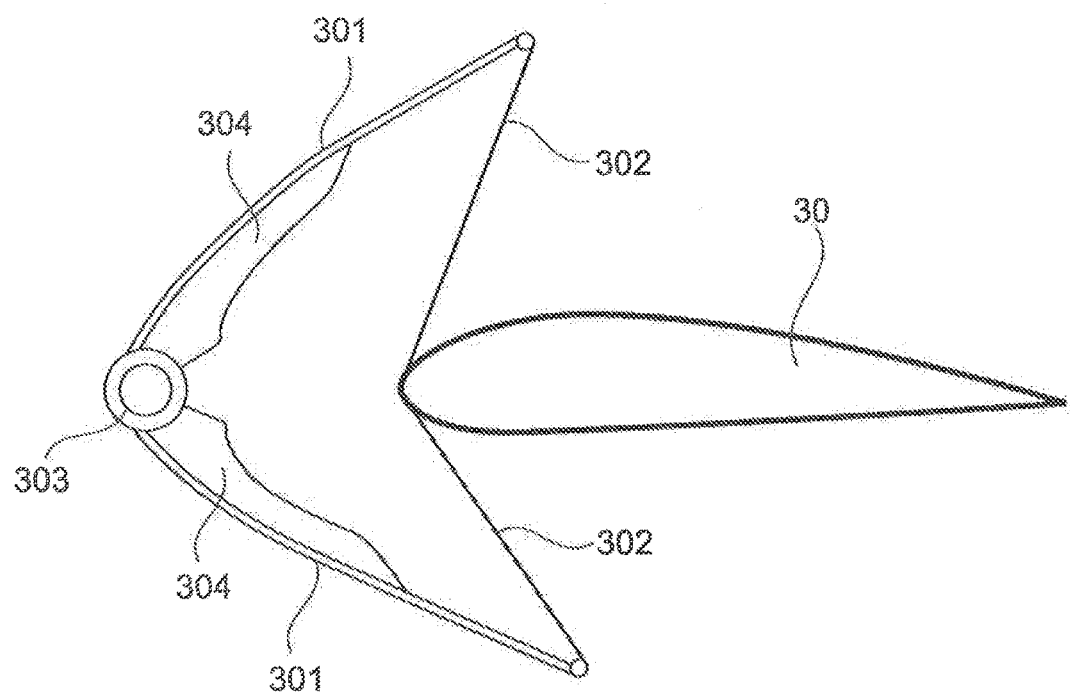
FIGS. 12 and 13 show schematic cross-sectional views of a claw of a capture system.
Figure 13:
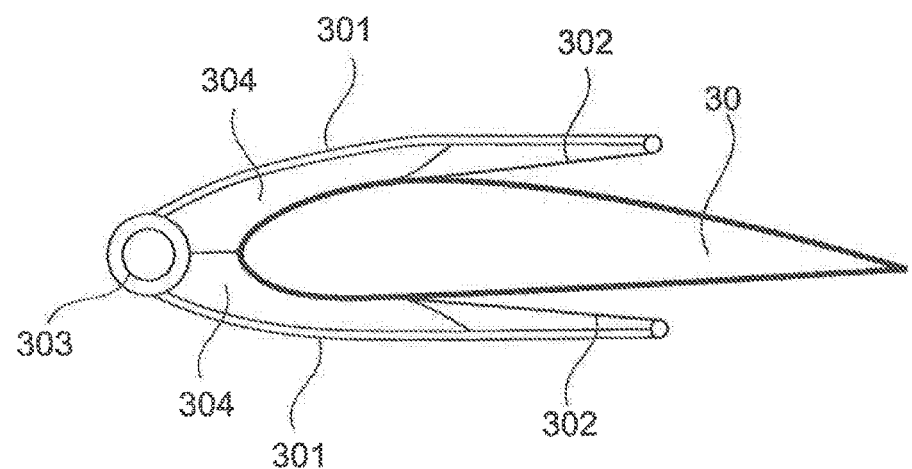

FIGS. 12 and 13 show schematic cross-sectional views of a claw 300 of the capture system. The claw 300 comprises a joint 303, arms 301, which include the flexible elements 304, and a capture strap 302. As shown in FIGS. 12 and 13, the claw 300 is designed to capture and hold an incoming wing construction 30. As shown in FIGS. 12 and 13, the incoming wing construction 30 tensions the capture straps 302, causing them to pull the arms 301 towards one another and wrap around the wing construction 30 and thus capture it. In the closed state, as shown in FIG. 13, the arms 301 partly surround the silhouette of the wing construction 30, causing the wing construction 30 to be held by the claw 301. The elements 304 have a shape similar to the wing contour, causing them to come into close contact with the wing construction 30. In addition or alternatively, they may consist of an elastic and/or non-slip material or be coated therewith on the wing side. The arms 301 and the elements 304 may be formed in one piece.

Figure 14:
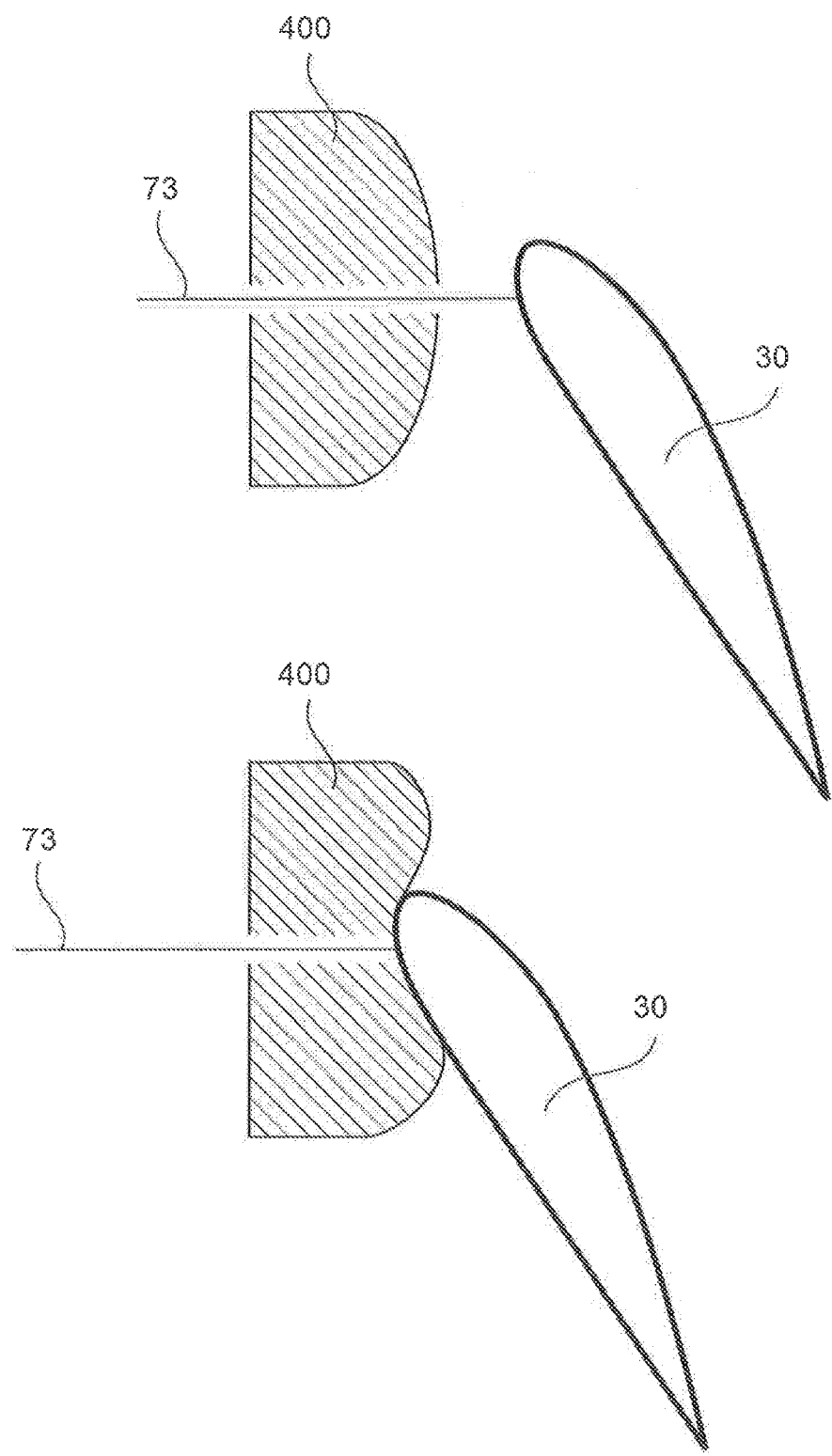
FIG. 14 shows a schematic cross-sectional view of the preferred embodiment of the capture device with capture cushion in the state before and after arrival of the wing construction.

FIG. 14 shows a schematic cross-sectional view of an embodiment of the capture device with capture cushion 400 in the state before (top) and after (bottom) arrival of the wing construction. The wing construction is coupled to the ground station 10 by means of the tether line 40 (FIG. 1) and is thereby pulled into the capture device 400, which deforms owing to the flowable filling and the flexible envelope.

The invention claimed is:

1. A flight-capable, wind-driveable wing construction (30) comprising:
   (i) a tether line (40), which is designed to connect the wing construction to a ground station (10) during operation, and one end of the tether line (40) being attached to the wing construction; and
   (ii) a bridle line system comprising a multiplicity of bridle lines (70, 71), where at least two bridle lines have an end connected to the wing construction and at least one bridle line of the at least two bridle lines has an end which is connected to the tether line (40), and the bridle line system being detachably connected to the tether line, during operation;

wherein the tether line (40) has a first sleeve (130) which is attached to the tether line, the bridle line system has a second sleeve (120), to which the at least one bridle line (70, 71) is connected, and, during operation, a capture cable is passed through the second sleeve, and the first and second sleeves are designed to form a detachable positive or non-positive connection during operation.

2. The wing construction according to claim 1, wherein the second sleeve (120) has at least one clamping body (171, 181) which, in a first position, engages into a recess in the first sleeve (130), and comprises a releasable locking system which is designed to fix the at least one clamping body (171, 181) in the first position in a first state and, in a further state, to facilitate the movement of the at least one clamping body into a second position in which the at least one clamping body does not engage into the recess of the first sleeve (130).

3. A wind power installation comprising a flight-capable, wind-driveable wing construction (30) and a ground station (10) to which the wing construction is connected, wherein the wind power installation comprises the wing construction which has
 (i) a tether line (40), which is designed to connect the wing construction to a ground station (10) during operation, and one end of the tether line (40) being attached to the wing construction; and
 (ii) a bridle line system comprising a multiplicity of bridle lines (70, 71), where at least two bridle lines have an end connected to the wing construction and at least one bridle line of the at least two bridle lines has an end which is connected to the tether line (40), and the bridle line system being detachably connected to the tether line, during operation;
wherein the tether line (40) has a first sleeve (130) which is attached to the tether line, the bridle line system has a second sleeve (120), to which the at least one bridle line (70, 71) is connected, and, during operation, a capture cable is passed through the second sleeve, and the first and second sleeves are designed to form a detachable positive or non-positive connection during operation.

4. The wind power installation according claim 3, wherein the wind power installation has a cable ratchet actuation device (84) through which the tether line (40) is passed during operation and which is designed to release the locking of the second sleeve (120), when the second sleeve adopts a predetermined position relative to the cable ratchet actuation device.

5. The wind power installation according to claim 4, wherein the second sleeve (120) has at least one clamping body (171, 178, 181) which, in a first position, engages with a recess in the first sleeve (130), and a locking element which fixes the at least one clamping body in the first position (171, 178, 181) in a first state, is movable from a first position into a second position when the second sleeve is pulled into the cable ratchet actuation device (84), which facilitates movement of the at least one clamping body into the second position.

6. The wind power installation according to claim 4, wherein
 (i) the cable ratchet actuation device (84) is integrated into a first capture device (100, 150, 73) which has at least one capture ratchet (150), which is mounted in such a way that it is able to rotate, and
 (ii) the wing construction (30) has a second capture element (189, 190, 160) having at least one recess (160),
wherein the at least one capture ratchet (150) and the at least one recess (160) are shaped in such a way that the wing construction (30) is detachably attached to the capture device when a projection of the at least one capture ratchet engages into the at least one recess.

7. The wind power installation according to claim 4, wherein the cable ratchet actuation device (84) is integrated into a capture device (300, 301, 302, 303, 304) which contains one or more claws (300) which are designed to attach the wind-driveable wing construction (30) to the capture device in a detachable manner.

8. The wind power installation according to claim 7, wherein the one or more claws (300) each have at least two arms (301) linked to a base of a claw, and the one or more claws (300) each have one or more resiliently elastic elements or at least one drive, which are designed to provide at least one arm (301) with a torque.

9. The wind power installation according to claim 4, wherein the wind power installation has a mast (20) having a first end, which is connected to the ground station (10), and a second end, to which the cable ratchet actuation device (84) is connected.

10. The wind power installation according to claim 9, wherein the mast (20) is connected to the ground station (10) in such a way that the mast is pivotable about two axes, and comprises a tracking system (80, 81, 82, 83), to which the cable ratchet actuation device (84) is attached,
wherein the tracking system (80, 81, 82, 83):
 (i) comprises one or more sensors (90) which are designed to determine at least one of a distance of the tether line (40) from the sensor and a lateral position of the tether line in front of the sensor, and
 (ii) comprises a control device which is designed to control drives of the tracking system based on information from the sensors (90) in such a way that the cable ratchet actuation device (84) tracks a movement of the tether line (40).

11. The wind power installation according to claim 10, wherein the one or more sensors (90) comprise a multiplicity of at least one of optical and acoustic sensors.

12. The wind power installation according to claim 10, wherein the one or more sensors (90) comprise ultrasound sensors.

13. The wind power installation according to claim 3, wherein the wind power installation comprises a capture device (400, 73) which is designed to capture the wing construction (30) by a capture cushion (400) that has a plastic supporting area and a flexible envelope and a flowable or pourable filling, and the capture cushion is enabled to be plastically deformed by the incoming wing construction so that the wing construction and the capture device form a detachable positive connection.

14. A wind power installation comprising a flight-capable, wind-driveable wing construction (30) and a ground station (10), wherein the wing construction (30) comprises:
 (i) a tether line (40) which is designed to connect the wing construction to the ground station (10) during operation, and one end of the tether line (40) is attached to the wing construction; and
 (ii) a bridle line system which comprises a multiplicity of bridle lines (70, 71), where at least two bridle lines have an end which is connected to the wing construction and at least one bridle line has an end which is connected to the tether line (40), and the bridle line system is detachably connected to the tether line during operation, wherein the wind power installation further comprises a capture device (400, 73) which is designed to capture the wing construction (30) by a capture cushion (400) that has a plastic supporting area and a flexible envelope and a flowable or pourable filling, the capture cushion is enabled to be plastically deformed by the incoming wing construction so that the wing construction and the capture device form a detachable positive connection.

15. Use of a cushion element having a plastic supporting area and a flexible envelope and a flowable or pourable filling for capturing a flight-capable, wind-driveable wing construction (30) that is part of a wind power installation, wherein
  (i) plastically deforming the supporting area of the cushion element (400) by the incoming wing construction so that wing construction and capture device form a detachable positive connection, and
  (ii) providing the wing construction (30) with a tether line (40), which is designed to connect the wing construction to a ground station (10) during operation, and attaching one end of the tether line (40) to the wing construction; and providing the wing construction with a bridle line system, which comprises a multiplicity of bridle lines (70, 71), at least two bridle lines have an end which is connected to the wing construction and at least one bridle line has an end which is connected to the tether line (40), and the bridle line system is detachably connected to the tether line during operation.

16. The use of a cushion element according to claim 15, wherein the cushion element (400):
  (a) is provided with one or more openings to a surrounding environment, through which ambient air, or for the purposes of control of the acceleration forces on the wing construction,
  (b) is divided into a plurality of chambers which are connected by connecting holes or channels which are designed in such a way that the cushion filling is able to flow between the chambers in a throttled manner,
  (c) is placed under overpressure in order to increase the deformation stiffness and to reduce the depth to which the incoming wing construction sinks in for the same impact force, or
  (d) is placed under reduced pressure in order to increase its plasticity and to improve the positive connection between the wing construction and the cushion element.

* * * * *